US005665871A

United States Patent [19]

Pedrazzi

[11] Patent Number: 5,665,871
[45] Date of Patent: Sep. 9, 1997

[54] MIXTURES OF COPPER PHTHALOCYANINE AND COPPER-CONTAINING AZO DYES, THEIR PRODUCTION AND USE

[75] Inventor: Reinhard Pedrazzi, Allschwil, Switzerland

[73] Assignee: Clariant Finance (BVI) Limited, Tortola, Virgin Islands (Br.)

[21] Appl. No.: 556,155

[22] Filed: Nov. 9, 1995

[30] Foreign Application Priority Data

Nov. 10, 1994 [DE] Germany ............ 44 40 091.8

[51] Int. Cl.$^6$ ............ C09B 67/22; C09D 11/16; D21H 19/00; B41J 2/01
[52] U.S. Cl. ............ 534/573; 8/638; 8/639; 8/641; 8/919; 106/21.32; 106/31.46; 162/162; 347/1
[58] Field of Search ............ 534/573; 8/638, 8/639, 641, 919; 162/162; 106/23 R, 23 K; 347/1

[56] References Cited

U.S. PATENT DOCUMENTS

| | | | |
|---|---|---|---|
| 3,059,988 | 10/1962 | Koller et al. | 534/573 M X |
| 4,111,650 | 9/1978 | Lacroix et al. | 8/85 |
| 4,521,217 | 6/1985 | Beck et al. | 8/639 |
| 4,671,799 | 6/1987 | Degen et al. | 8/639 |
| 4,838,895 | 6/1989 | Galli et al. | 8/527 |
| 5,489,330 | 2/1996 | Wunderlich | 106/20 D |

FOREIGN PATENT DOCUMENTS

| | | |
|---|---|---|
| 0114043 | 7/1984 | European Pat. Off. . |
| 2109806 | 5/1972 | France . |
| 3236238 | 5/1984 | Germany . |
| 3445225 | 12/1984 | Germany . |
| 57-145155 | 9/1982 | Japan . |
| 1297468 | 11/1989 | Japan . |
| 2275479 | 8/1994 | United Kingdom . |

*Primary Examiner*—Floyd D. Higel
*Attorney, Agent, or Firm*—Robert S. Honor; Carl W. Battle; Thomas C. Doyle

[57] ABSTRACT

The invention relates to mixtures comprising one or more phthalocyanine dyes of formula I $$\text{CuPc} \begin{array}{c} (SO_2NH-A-N-R_1)_x \\ | \\ R_2 \\ (SO_3M)_y \end{array} \quad \text{I}$$

wherein
  CuPc is the radical of a Cu-phthalocyanine dye,
  A is selected from the group consisting of optionally substituted, linear or branched $C_2$–$C_6$-alkylene groups,
  $R_1$ and $R_2$ independently of one another, are selected from the group consisting of hydrogen or optionally substituted, linear or branched $C_1$–$C_6$-alkyl,
  M is selected from the group consisting of hydrogen, lithium, sodium, potassium, ammonium or substituted ammonium,
  x and y is 1 to 3, with the provision that the sum of x+y is 3 to 4, and; one or more azo dyes of formula II:

$$\left[ \begin{array}{c} (SO_3M)_b \\ \text{N=N} \end{array} \underset{(SO_3M)_a}{\bigcirc} \text{N=N} \underset{R_3}{\bigcirc} \underset{MO_3S}{\overset{O-Cu\cdots O}{\bigcirc}} \text{N=N} \bigcirc \right]_n \quad (II)$$

$$-NH-\bigcirc\Bigg]_m$$

wherein
  $R_3$ is selected from the group consisting of hydrogen, methyl or methoxy
  M independently of each other, has one of the meanings given in formula I,
  a is 1 or 2, and
  b is 0 or 1,
  n is 1 or 2, and
  m is 0 or 1, with the provision that when n equals 1, m equals 1, and when n equals 2, m equals 0,
and stable, salt-free or low-in-salt formulations of such dyestuff mixtures, production processes thereof and use thereof.

24 Claims, No Drawings

MIXTURES OF COPPER PHTHALOCYANINE AND COPPER-CONTAINING AZO DYES, THEIR PRODUCTION AND USE

The present invention relates to dyestuff mixtures, stable aqueous formulations of these dyestuff mixtures which are salt-free or low in salt, their production and use.

The object of the present invention is to prepare new blue dyestuff mixtures for dyeing paper, which are present as stable, optionally concentrated, aqueous liquid formulations, and are free from organic solvents. The new dyestuff mixtures should have good fastness during use and should exhibit a high degree of brilliance.

In the case of anionic Cu-phthalocyanine dyes, e.g. Direct Blue 86 or Direct Blue 199, mixtures may indeed be produced with anionic azo dyes, and in principle, clear blue shades are obtained. However, if, in addition to clarity of the shade, a high bath exhaustion and good bleeding fastness to water, alcohol, soap and milk are also required, then a fixing agent must additionally be employed when dyeing tissue-quality, owing to the inadequate substantivity of the turquoise dyes. Because of this, the dyeings lose clarity and often even become dull.

High bath exhaustion and bleeding fastness, together with brilliant clear blue shades may indeed also be obtained when dyeing with cationic Cu-phthalocyanine dyes, e.g. Basic Blue 140, Basic Blue 157 or Basic Blue 161, in combination with anionic azo dyes. However, these dyes may not be mixed, since they precipitate owing to the different charge, resulting in an insoluble pigment. They therefore have to be added to the cellulose individually, in succession, in a time-consuming process, which entails the danger of variations in shade and levelness problems.

It has now surprisingly been found that cellulosic materials such as paper and pulp, cellulose, regenerated cellulose and cotton when dyed with the dyestuff mixtures according to the invention give clear, neutral-blue shades with high brilliance, excellent light- and wet-fastness, and simultaneously very good non-staining of the back-water, without the need of a fixing step. The formulations of the dyestuff mixtures according to the invention are notable for their excellent storage-stability.

The invention accordingly relates to a mixture comprising:

one or more phthalocyanine dyes of formula I

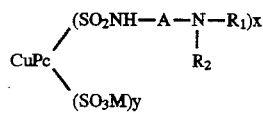

wherein

CuPc is the radical of a Cu-phthalocyanine dye,

A is an optionally substituted, linear or branched $C_2$–$C_6$-alkylene group, $R_1$ and $R_2$ independently of one another, are hydrogen or optionally substituted, linear or branched $C_1$–$C_6$-alkyl, M is hydrogen, lithium, sodium, potassium, ammonium or substituted ammonium;

x and y denote 1 to 3, with the provision that the sum of x+y is 3 to 4, and;

one or more azo dyes of formula

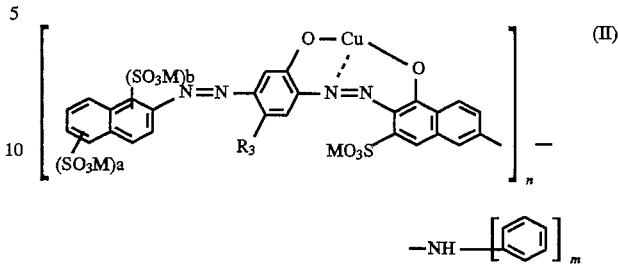

wherein $R_3$ is hydrogen, methyl or methoxy,

M independently of each other, has one of the meanings given in formula I, a is 1 or 2, b is 0 or 1, n is 1 or 2, and m is 0 or 1, with the provision that when n equals 1, m equals 1, and when n equals 2, m equals 0.

Possible substituents on A are OH or $C_1$–$C_6$-alkoxy.

Examples of substituents for $R_1$ and $R_2$ are OH, $C_1$–$C_6$-alkoxy, amino, $C_1$–$C_6$-alkylamino, $C_1$–$C_6$-dialkylamino and sulphato.

The dyestuffs of formula I are known and are described e.g. in JP-A-01 297 468 and in EP-A-0 596 383.

The dyestuffs of formula II are similarly known and are described for example in Japanese Kokai No. 57-145155.

Preference is given to dyestuffs of formula I, wherein

A is ethylene or propylene, $R_1$ and $R_2$ independently of one another, signify hydrogen or linear or branched $C_1$–$C_3$-alkyl which is optionally substituted by hydroxy, and M is hydrogen, lithium or sodium, especially preferably sodium or lithium.

Especially preferred dyestuffs of formula I possess the formula I'

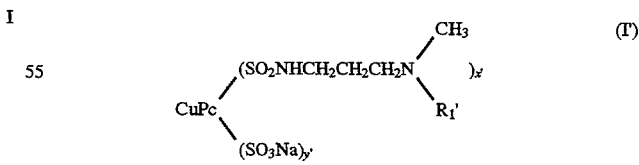

wherein $R_1'$ is —$CH_3$ or —$CH_2CH_2OH$ and x' is 2.5 to 3 and y' is 1 to 1.5.

Preferred compounds of formula II possess the formula II'

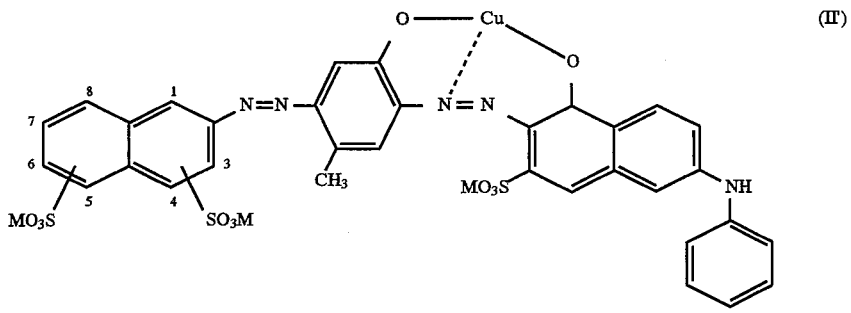

(II')

wherein
M independently of one another, denote hydrogen, potassium or sodium, and the two variable sulphonic acid groups are bonded either in the 4- and 8-position or in the 6- and 8-position.

Components I and II are present in the mixture according to the invention in a molar ratio of 8:1 to 1:2, preferably 5:1 to 1:1.

The dyestuff mixtures according to the invention are obtainable in a manner known per se, for example by forming an aqueous solution of the relevant components in the abovementioned weight ratio. The aqueous solution may be prepared for example by dissolving one or more of dyestuff (I) and one or more of dyestuff (II), the dyestuffs for example being in the form of a moist press-cake or in the dry state, advantageously in water; the components being added to the water in an arbitrary sequence. Alternatively the synthesis solutions of one or more of dyestuff (I) and one or more of dyestuff (II), are mixed directly without intermediate isolation of the dyestuff.

The use of a membrane process for the production of dyestuff formulations of dyestuffs (I) is indeed mentioned in JP-A-01 297 468 and in EP-A-0 596 383. However, it was both surprising and unforeseeable that an aqueous solution comprising a mixture of one or more of dyestuff (I) and one or more of dyestuff (II), could be desalted and concentrated at a high flow rate, without a concomitant detectable increase in viscosity of the thus treated solution. If desalting and concentration of the dyestuffs (I) and (II) are carried out separately, viscous solutions are obtained, which can only be poorly mixed.

Accordingly the invention also provides storage-stable, low viscosity formulations of the dyestuff mixtures according to the invention, in the form of a salt-free or low-in-salt aqueous solution of one or more of dyestuff (I) and one or more of dyestuff (II).

By the term "low viscosity formulations" is meant formulations having a viscosity in the range of from 10 to 100 mPas, preferably from 10 to 30 mPas at 20° C., when measured using a Brookfield viscometer.

The present invention further provides a process for the production of storage-stable, optionally concentrated, aqueous dyestuff formulations having a low viscosity, whereby firstly a mixture of one or more dyestuffs of formula (I) with one or more dyestuffs of formula (II) is produced, the mixture thereafter being desalted by employing a membrane process, for example ultra-filtration in a pH range of between 7 and 13, preferably between 8.5 and 11, and optionally thereafter concentrated. The concentration may be by any conventional means of concentrating liquids. Preferably when the desalting has been carried out using ultra-filtration, the concentration is also carried out by ultra-filtration. The mixture of dyestuffs may be produced by for example, mixing the synthesis solution or the successful isolate which has been isolated with salt and has subsequently been redissolved or m-suspended, of one or more dyestuffs of formula (I), with one or more dyestuffs of formula (if). The formula (II) dyestuff may be in the form of the synthesis solution or the successful isolate which has been isolated with salt and has subsequently been redissolved or re-suspended, of one or more dyestuffs of formula (II).

The invention similarly relates to stable, low viscosity formulations of the dyestuff mixtures according to the invention in the form of a salt-free or low-in-salt aqueous solution of the dyestuffs I and II, obtainable by mixing one or more dyestuffs of formula (I) with one or more dyestuffs of formula (II), so that an aqueous solution is obtained, with subsequent desalting by employing a membrane process in a pH range of between 7 and 13 and optionally thereafter concentrating the mixture,.

Surprisingly the dyestuff formulations obtained in this way, display very good storage-stability, for example in a temperature range of between −20° C. and +50° C. over several weeks. Accordingly the dyestuff formulations according to the invention are preferably free from solubility-improving additives. If desired, however, it is possible to have further additives, such as hydroxides, carbonates and hydrogen carbonates of lithium, sodium, potassium, ammonium or substituted ammonium, alkanolamines such as monoethanol-, diethanoi-, triethanol-, 3-propanol-, 2-propanol-, diisopropanol-, dimethyl- and diethylaminopropylamine, or acid amide compounds such as urea, alkylurea, ε-caprolactam, ethylene-, diethylene-, polyethylene-, propylene-, butylene-glycol, methyl cellosolve, carbitol, methylcarbitol, butyl polyglycol, glycerin, tetrahydrofuran, dioxane, butyrolactone, N-methyl-2-pyrrolidone, formanaide, dimethylformamide.

The dyestuff mixtures according to the invention and formulations thereof are suitable for dyeing and printing cellulosic material, e.g. paper, pulp, cellulose, regenerated cellulose and cotton. They are especially suitable for dyeing paper and cellulose. The dyeings exhibit good fastness during use, in particular, excellent light fastness and high brilliance.

In general, the following possibilities exist for dyeing papers and cellulose:

(a) pulp-dyeing, in which the dyestuffs are added to the pulp which has not yet been processed into paper, during or after heating of the cellulose.

(b) surface-dyeing, in which the dyestuffs are added to the size liquor during the paper sizing operation.

In addition, other methods may be considered, in which a coating mass consisting of dyestuffs, inorganic white pigments, binders and optionally further additives, is applied to the paper surface.

The dyestuff formulations according to the invention are suitable for any dyeing method, but preferably for pulp-dyeing. Preferably the formulations are applied in a dyeing stock having a pH value in the range of from 4.0 to 8.0. Accordingly preferably the pH of the dyeing stock is monitored and adjusted where necessary, to a pH value within the preferred range.

For pulp-dyeing, the cellulose is firstly beaten to a certain degree of beating. Then, the dyestuff formulation according to the invention is added to the pulp at a temperature in the range of from 10°–40° C. In addition, the usual sizing agents, aluminum sulphate, paper strengtheners, fixing agents, etc. are added as required. The pulp subsequently undergoes the usual paper production and drying procedures. In this way, an even, brilliant blue-dyed paper is obtained, which exhibits no mottling.

For surface-dyeing in the sizing press, the cellulose is similarly firstly beaten to a certain degree of beating. Then, the usual fillers, sizing agents, aluminum sulphate, fixing agents, etc. are added to the pulp as required. The pulp is subsequently processed into paper by a conventional method. Afterwards, the paper is treated in the sizing press with a size containing the dyestuff formulation according to the invention, and subsequently dried. In this way, a brilliant blue-dyed paper is obtained.

The present invention relates furthermore to the use of the dyestuff formulations according to the invention as printing liquids for printing carrier materials using an ink-jet printing system. Such a printing liquid preferably contains 0.5–15% by weight of an alkali or ammonium salt of the dyestuff mixture, according to the invention, consisting of dyestuffs of formula I and formula II, 0–30% by weight of one or more water-soluble organic solvents, water and optionally further conventional additives for ink-jet printing liquids, and it has a pH value of 8 to 12.

Suitable solvents are for example glycols and glycol ethers, such as ethylene glycol, diethylene glycol, triethylene glycol, 1,2-dihydroxypropane, 1-ethoxy-2-hydroxypropane, polyethylene glycols with a molecular weight of up to 500, heterocyclic ketones such as 2-pyrrolidone, 2-(N-methyl)-pyrrolidone and 1,3-dimethyl-imidazolid-2-one.

The ink-jet printing process is known per se. In this, drops of a printing liquid are fired from one or more jets onto a carrier material, e.g. onto paper, wood, textiles, plastic or metal. By means of electronic control, the individual drops are combined to form characters or graphic patterns.

The blue-colored prints on writing paper obtained with the printing liquids according to the invention, using an ink-jet printing system, are notable for their good light and wet fastness.

The formulations of the present invention may furthermore be combined with one or more other known dyestuffs not encompassed by the present invention and the combination used in dyeing and printing processes. When such combinations are made, the compatability between the components should be determined on a small scale before preparing large scale quantities. The compatability may be determined by for example determining the storage-stability of the combination.

The following examples serve to illustrate the invention. If not otherwise stated, the parts and percentages in the examples are by weight.

EXAMPLE 1

46.7 parts of the Cu-phthalocyanine dyestuff obtained according to example 2 of JP-A-01 297 468 and 14 parts of the azo dyestuff obtained according to example 1 of JP-A-57 145 155 are stirred, in the form of moist press-cakes, into 250 parts of demineralized water, and the pH set at a value of 12, by adding 1.6 parts 30% caustic soda. Ca. 400 parts of a deep blue dyestuff solution are obtained. After heating to 45°–48° C., continuous ultra-filtration is carded out, with constant addition of an mount of water corresponding to the permeate, using a semi-permeable polyethylene glycol membrane with a "cut-off level" of 2,000 to 15,000 Daltons, and a pressure of 15–30 bar. After removing, without loss of dyestuff, 98% of the theoretically calculable mount of sodium chloride from the original solution, which is the case after a diafiltration rate of 2.8, the addition of water is stopped, and after concentrating the dyestuff solution to 275 parts, the ultra-filtration is stopped.

The thus obtained dyestuff solution is stable in storage, and at 20° C. has a viscosity of only 15 mPas. The λ-max value in an aqueous ammonium acetate solution is 608 nm.

EXAMPLE 2

By replacing the 46.7 parts of the Cu-phthalocyanine dyestuff (Ex. 2 of JP-A-01 297 468) used in example 1 above, with 50 parts of the Cu-phthalocyanine yestuff according to example 1 of EP-A-0 596 383, and otherwise proceeding in the same way, a stable liquid formulation according to the invention is obtained, which is stable in storage over a long period and has a viscosity of only 18 mPas at 20° C. The resulting formulation also produces e.g. even, brilliant greenish-blue dyeings with excellent wet and light fastness.

APPLICATION EXAMPLE A 70 parts of chemically bleached sulphite cellulose from coniferous wood and 30 parts of chemically bleached sulphite cellulose from birchwood in 2000 parts of water, are beaten in a Holländer. 2 parts of the liquid formulation from example 1 (2% based on cellulose) are added to this pulp and stirred for 20 minutes. A sheet of paper is formed using a hand-operated sheet former, the thus obtained sheet is pressed and dried. The thus obtained paper dyeing is of a brilliant, greenish-blue in a very deep shade, and has very good bleeding-fastness and light-fastness and displays good non-staining of the back-water.

APPLICATION EXAMPLE B 0.2 parts of the liquid formulation from example 1 are added to 5 parts of bleached sulphate cellulose from pinewood and 5 parts of bleached sulphate cellulose from birchwood, which have been beaten with 200 parts of water to 35° SR, and stirred for 5 minutes. Afterwards, sizing takes place by a conventional method with rosin size and aluminum sulphate. The thus obtained paper dyeing is of a brilliant greenish-blue in a very deep shade, and has very good wet and light fastness. The resulting back-water is practically colorless.

APPLICATION EXAMPLE C 10.4 parts of the liquid formulation obtained according to example 1 are diluted with a mixture of 81 parts of water and 9 parts of diethylene glycol, and set at a pH value of 9.8, by adding a little 10% hydrochloric acid. The thus obtained printing liquid, gives prints in blue shades with light and wet fastness on conventional writing paper using a Hewlett-Packard DeskJet® printer.

Instead of the liquid formulation from example 1, the liquid formulation from example 2 may also be used in application examples A to C.

I claim:

1. A mixture comprising:
one or more phthalocyanine dyes of formula I $$CuPc \begin{matrix} (SO_2NH-A-N-R_1)x \\ | \\ R_2 \\ (SO_3M)y \end{matrix} \quad \text{I}$$

wherein

CuPc is the radical of a Cu-phthalocyanine dye,

A is a substituted or unsubstituted, linear or branched $C_2$–$C_6$-alkylene group, $R_1$ and $R_2$, independently of one another, are hydrogen or substituted or unsubstituted, linear or branched $C_1$–$C_6$-alkyl, M is hydrogen, lithium, sodium, .potassium, ammonium or substituted ammonium, x and y are 1 to 3, with the provision that the sum of x+y is 3 to 4, and;

one or more azo dyes of formula II:

$$\left[ \begin{array}{c} \text{(SO}_3\text{M)}_b \\ \text{(SO}_3\text{M)}_a \end{array} \text{naphthyl-N=N-}\begin{array}{c} O-Cu \\ \vdots \\ R_3 \end{array}\text{-N=N-}\begin{array}{c} O \\ \vdots \\ MO_3S \end{array}\text{naphthyl} \right]_n^-$$

$$-NH-[\text{phenyl}]_m$$

wherein $R_3$ is hydrogen, methyl or methoxy, each M, independently of each other, has one of the meanings given in formula I, a is 1 or 2, b is 0 or 1, n is 1 or 2, and m is 0 or 1, with the provision that when n equals 1, m equals 1, and when n equals 2, m equals 0.

2. A mixture according to claim 1 wherein, in formula I,

A is ethylene or propylene, $R_1$ and $R_2$, independently of one another, are hydrogen or substituted or unsubstituted, linear or branched $C_1$–$C_3$-alkyl and M is hydrogen, lithium or sodium.

3. A mixture according to claim 2, wherein the $C_1$–$C_3$-alkyl is substituted by hydroxy.

4. A storage stable formulation of a dyestuff mixture according to claim 1 in the form of a salt-free or low-in-salt, aqueous solution of one or more dyestuffs of formula I and one or more dyestuffs of formula II having a viscosity in the range of from 10 to 100 mPas.

5. A storage-stable formulation of a dyestuff mixture according to claim 1 in the form of a salt-free or low-in-salt, aqueous solution of dyestuffs of formulae I and II having a viscosity in the range of from 10 to 100 mPas, obtainable by mixing one or more dyestuffs of formula I and one or more dyestuffs of formula II and water, whereby an aqueous solution is produced, and subsequently de-salting the mixture using a membrane process in a pH range of between 7 and 13.

6. A storage-stable formulation of a dyestuff mixture according to claim 2 in the form of a salt-free or low-in-salt, aqueous solution of dyestuffs of formulae I and II having a viscosity in the range of from 10 to 100 mPas, obtainable by mixing one or more dyestuffs of formula I and one or more dyestuffs of formula II and water, whereby an aqueous solution is produced, and subsequently de-salting the mixture using a membrane process in a pH range of between 7 and 13.

7. A process for the production of a storage-stable dyestuff formulation, which comprises mixing water and one or more dyestuffs of formula I and one or more dyestuffs of formula II according to claim 1, to produce an aqueous solution and de-salting the resulting aqueous solution by using a membrane process in a pH range of between 7 and 13.

8. A mixture according to claim 1 wherein any substituent on A is OH or $C_1$–$C_6$-alkoxy and any substituent on $R_1$ or $R_2$ is OH, $C_1$–$C_6$-alkoxy, amino, $C_1$–$C_6$-alkylamino, $C_1$–$C_6$-dialkylamino or sulphato.

9. A mixture according to claim 8 wherein the dyes of formulae I and II are present in a molar ratio of 8:1 to 1:2.

10. A mixture according to claim 9 wherein the dyes of formulae I and II are present in a molar ratio of 5:1 to 1:1.

11. A mixture according to claim 2 wherein $R_1$ and $R_2$, independently, are hydrogen or linear or branched $C_1$–$C_3$-alkyl or linear or branched $C_1$–$C_3$-hydroxyalkyl.

12. A mixture according to claim 11 wherein the dyes of formulae I and II are present in a molar ratio 5:1 to 1:1.

13. A mixture according to claim 11 wherein the dyestuff of formula I if a dyestuff of Formula I'

$$CuPc \begin{matrix} (SO_2NHCH_2CH_2CH_2N \begin{matrix} CH_3 \\ \diagdown \\ R_1' \end{matrix})_{x'} \\ (SO_3Na)_{y'} \end{matrix} \quad (I')$$

wherein $R_1'$ is —$CH_3$ or —$CH_2CH_2OH$, x' is 2.5 to 3 and y' is 1 to 1.5, and the dye of formula II is a dye of formula II'

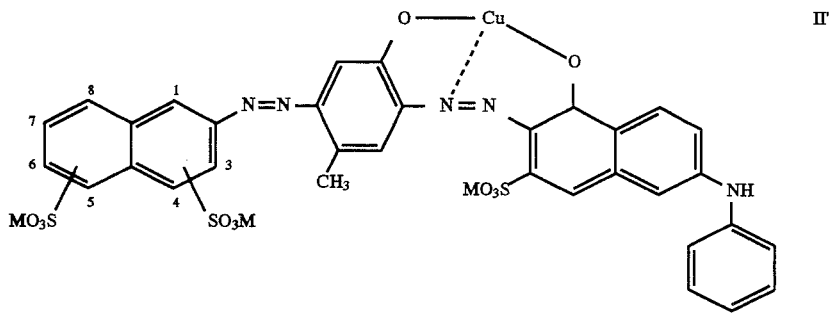

wherein each M, independently, is hydrogen, potassium or sodium and the two variable sulphonic acid groups are bonded either in the 4- and 8-positions or in the 6- and 8-positions.

14. A mixture according to claim 20 wherein the dyes of formulae I' and II' are present in a molar ratio of 5:1 to 1:1.

15. A concentrated, storage-stable formulation of a dyestuff mixture according to claim 1 in the form of a salt-free or low-in-salt, aqueous solution of dyestuffs of formulae I and II having a viscosity in the range of from 10 to 100 mPas, obtainable by mixing one or more dyestuffs of formula I and one or more dyestuffs of formula II and water, whereby an aqueous solution is produced, and subsequently de-salting and concentrating the solution using a membrane process in a pH range of between 7 and 13.

16. A concentrated, storage-stable formulation of a dyestuff mixture according to claim 2 in the form of a salt-free or low-in-salt, aqueous solution of dyestuffs of formulae I and II having a viscosity in the range of from 10 to 100 mPas, obtainable by mixing one or more dyestuffs of formula I and one or more dyestuffs of formula II and water, whereby an aqueous solution is produced, and subsequently de-salting and concentrating the solution using a membrane process in a pH range of between 7 and 13.

17. A process for the production of a storage-stable, concentrated dyestuff formulation according to claim 1 which comprises mixing together one or more dyestuffs of formula I and one or more dyestuffs of formula II and water to produce an aqueous solution, desalting the resulting aqueous solution by using a membrane process in a pH range of between 7 and 13, and thereafter concentrating the aqueous solution.

18. A method for dyeing or printing cellulosic material which comprises applying to the material a dyestuff mixture according to claim 1.

19. A method for dyeing or printing cellulosic material which comprises employing a formulation according to claim 4.

20. A method for dyeing paper which comprises applying thereto a dyestuff mixture according to claim 1.

21. A method for dyeing paper according to claim 20 which comprises (a) adding the dyestuff mixture to pulp which has not yet been processed into the paper or (b) adding the dyestuff mixture to the size liquor during a paper sizing operation.

22. A method for dyeing paper which comprises employing a formulation according to claim 4.

23. Ink-jet printing liquid, characterised in that it comprises
  a) 0.5–15% by weight of an alkali or ammonium salt of a dyestuff mixture according to claim 1,
  b) 0–30% by weight of one or more water-soluble organic solvents, and
  c) water
having a pH value of 8.5–12.0.

24. A method for printing a carrier material by means of an ink-jet printing system which comprises firing drops of an ink-jet printing liquid according to claim 23 from one or more jets onto the carrier material.

* * * * *